US009733019B2

United States Patent
Koike et al.

(10) Patent No.: US 9,733,019 B2
(45) Date of Patent: Aug. 15, 2017

(54) CONTAINER FOR HEAT TREATMENT OF POSITIVE-ELECTRODE ACTIVE MATERIAL FOR LITHIUM-ION BATTERY AND METHOD FOR PRODUCING THE SAME

(75) Inventors: Yasuta Koike, Tajimi (JP); Takashi Achiha, Kobe (JP); Takahiro Kamiya, Tajimi (JP)

(73) Assignee: TYK CORPORATION, Tokyo (JP)

( * ) Notice: Subject to any disclaimer, the term of this patent is extended or adjusted under 35 U.S.C. 154(b) by 938 days.

(21) Appl. No.: 14/008,908

(22) PCT Filed: Jun. 28, 2011

(86) PCT No.: PCT/JP2011/003669
§ 371 (c)(1),
(2), (4) Date: Sep. 30, 2013

(87) PCT Pub. No.: WO2012/131791
PCT Pub. Date: Oct. 4, 2012

(65) Prior Publication Data
US 2014/0021661 A1    Jan. 23, 2014

(30) Foreign Application Priority Data

Mar. 30, 2011    (JP) .................................. 2011-075473

(51) Int. Cl.
*F27D 5/00*    (2006.01)
*F27D 3/12*    (2006.01)
(Continued)

(52) U.S. Cl.
CPC ............ *F27D 5/0068* (2013.01); *B32B 18/00* (2013.01); *C04B 35/1015* (2013.01);
(Continued)

(58) Field of Classification Search
CPC ....... C04B 35/01; C04B 35/10; C04B 35/101; C04B 35/1015; C04B 35/443;
(Continued)

(56) References Cited

U.S. PATENT DOCUMENTS 3,953,563 A * 4/1976 Kihlstedt .............. C04B 35/101
264/333
3,959,002 A    5/1976 Esper
(Continued)

FOREIGN PATENT DOCUMENTS

CN    88101391 A    10/1988
CN    1148376 A    4/1997
(Continued)

OTHER PUBLICATIONS

U.S. Appl. No. 14/008,755, filed Sep. 30, 2013, Koike, et al.
(Continued)

*Primary Examiner* — Lee E Sanderson
(74) *Attorney, Agent, or Firm* — Oblon, McClelland, Maier & Neustadt, L.L.P.

(57) ABSTRACT

A container for heat treatment of a positive-electrode active material for a lithium-ion battery to the present invention is characterized by having a base portion containing 60 to 95 mass % of alumina, and a surface portion containing 20 to 80 mass % of spinel and formed integrally with the base portion. Moreover, a production method of the present invention is characterized by comprising a step of placing an alumina-based powder, a step of placing a spinel-based powder above the alumina-based powder, a step of forming a compact by compressing the powders and a step of firing the compact.

14 Claims, 4 Drawing Sheets

(51) Int. Cl.
| | | |
|---|---|---|
| F27D 1/00 | (2006.01) | |
| B32B 18/00 | (2006.01) | |
| C04B 35/101 | (2006.01) | |
| C04B 35/117 | (2006.01) | |
| C04B 35/18 | (2006.01) | |
| C04B 35/443 | (2006.01) | |
| C04B 35/64 | (2006.01) | |
| H01M 4/139 | (2010.01) | |
| H01M 10/0525 | (2010.01) | |

(52) U.S. Cl.
 CPC ............ *C04B 35/117* (2013.01); *C04B 35/18* (2013.01); *C04B 35/443* (2013.01); *C04B 35/64* (2013.01); *F27D 1/0006* (2013.01); *F27D 3/12* (2013.01); *H01M 4/139* (2013.01); *C04B 2235/3217* (2013.01); *C04B 2235/3222* (2013.01); *C04B 2235/3418* (2013.01); *C04B 2235/3463* (2013.01); *C04B 2235/3481* (2013.01); *C04B 2235/5436* (2013.01); *C04B 2235/77* (2013.01); *C04B 2235/80* (2013.01); *C04B 2235/96* (2013.01); *C04B 2235/9692* (2013.01); *C04B 2237/341* (2013.01); *C04B 2237/343* (2013.01); *C04B 2237/58* (2013.01); *H01M 10/0525* (2013.01); *Y10T 428/1314* (2015.01)

(58) Field of Classification Search
 CPC .... C04B 2235/3217; C04B 2235/3222; C04B 2235/3463; C04B 2235/9692; C04B 2237/30; C04B 2237/32; C04B 2237/34; C04B 2237/343; C04B 35/117; F27D 1/0006; F27D 5/0068; F27D 2005/0075; F27D 2005/0081; F27D 2005/0087; F27D 2005/0093; F27D 5/00; F27D 5/0006; F27D 5/0031; F27D 5/0037; F27D 5/0043; F27D 5/005; F27D 5/0056; F27D 5/0062; Y02P 70/54
 USPC .... 428/34.4, 34.5, 34.6, 325, 336, 446, 697, 428/698, 701, 702; 219/546, 548; 432/253, 258, 261
 See application file for complete search history.

(56) References Cited

U.S. PATENT DOCUMENTS

| 4,906,509 | A | * | 3/1990 | Nishio ................... C04B 33/32 428/143 |
|---|---|---|---|---|
| 6,096,432 | A | | 8/2000 | Sakaguchi et al. |
| 2002/0042984 | A1 | | 4/2002 | Kumazawa et al. |

FOREIGN PATENT DOCUMENTS

| CN | 1480425 A | 3/2004 |
|---|---|---|
| CN | 1789204 A | 6/2006 |
| JP | 57-075850 A | 5/1982 |
| JP | 63-224937 A | 9/1988 |
| JP | 4-280874 A | 10/1992 |
| JP | 10-267562 A | 10/1998 |
| JP | 2001-220248 A | 8/2001 |
| JP | 2004-281163 A | 10/2004 |
| JP | 2004-307338 A | 11/2004 |
| JP | 2005-257171 A | 9/2005 |
| JP | 2007-076935 A | 3/2007 |
| JP | 2008-094631 A | 4/2008 |
| JP | 2008-103100 A | 5/2008 |
| JP | 2008-105870 A | 5/2008 |
| JP | 2009-292704 A | 12/2009 |
| KR | 10-2009-0055696 A | 6/2009 |
| KR | 10-2009-0078952 A | 7/2009 |

OTHER PUBLICATIONS

Notice of Allowance issued Aug. 27, 2014 in Korean Patent Application No. 10-2013-7025870.
Notice of Allowance issued Feb. 26, 2015 in Korean Patent Application No. 10-2013-7025869 (with English language translation).
Office Action issued May 6, 2015 in Chinese Patent Application No. 201180069879.X (with English language translation).
Combined Chinese Office Action and Search Report issued May 20, 2015 in Patent Application No. 201180069877.0 (with English Translation).
Combined Chinese Office Action and Search Report issued Sep. 29, 2015 in Patent Application No. 201180069879.X (with English Translation).
Combined Chinese Office Action and Search Report issued Jul. 3, 2014 in Patent Application No. 201180069877.0 with Partial English Translation and English Translation of Category of Cited Documents.
Combined Chinese Office Action and Search Report issued Jul. 1, 2014 in Patent Application No. 201180069879.X with Partial English Translation and English Translation of Category of Cited Documents.
Office Action issued Dec. 23, 2015 in Chinese Patent Application No. 201180069879.X (with English language translation).
Office Action mailed Apr. 22, 2016, in co-pending U.S. Appl. No. 14/008,755.
International Search Report issued Sep. 20, 2011 in PCT/JP2011/003669.
International Preliminary Report on Patentability issued Oct. 3, 2013 in PCT/JP2011/003669 (with English language translation).
Written Opinion of the International Searching Authority issued Sep. 20, 2011 in PCT/JP2011/003669 (with partial English language translation).
Office Action issued Sep. 13, 2011 in Japanese Patent Application No. 2011-075473 (with partial English language translation).
Explanation of Circumstances Concerning Accelerated Examination issued Jul. 25, 2011 in Japanese Patent Application No. 2011-75473.
Office Action issued Dec. 16, 2015, in co-pending U.S. Appl. No. 14/008,755.

* cited by examiner

CONTAINER FOR HEAT TREATMENT OF POSITIVE-ELECTRODE ACTIVE MATERIAL FOR LITHIUM-ION BATTERY AND METHOD FOR PRODUCING THE SAME

TECHNICAL FIELD

The present invention relates to a container for heat treatment of a positive-electrode active material for a lithium-ion battery to be used in applying heat treatment to raw material powder of a positive-electrode active material for a lithium-ion battery.

BACKGROUND ART

A variety of compounds, especially inorganic compounds are produced through a heat treatment step. In general, heat treatment is carried out by heating a compound (an inorganic compound or a raw material thereof) to be thermally treated with the compound held by a heat-resistant heat treatment container. The heat treatment container is demanded to have not only heat resistance but also stability against the compound to be thermally treated.

One example of the abovementioned inorganic compounds produced through the heat treatment step is a lithium-containing compound. The lithium-containing compound is used, for example, for a positive-electrode active material of a lithium-ion battery. Examples of the lithium-containing compound include $LiMnO_2$-based compounds, $LiN_{1/3}Co_{1/3}Mn_{1/3}O_2$-based compounds, $LiMn_2O_4$-based compounds, $LiCoO_2$-based compounds and $LiNiO_2$-based compounds.

The positive-electrode active material of the lithium-ion battery (the lithium-containing compound) is produced by firing raw material powder. In general, this heat treatment (firing) of the lithium-containing compound is performed with the raw material powder stored in a container (a saggar) which was produced by firing a material having such a heat-resistant material as alumina, mullite, cordierite and spinel as a main component thereof. The saggar is disclosed, for example, in Japanese Unexamined Patent Publication No. 2009-292704.

A saggar having cordierite as a main component thereof has a high thermal shock resistance. However, since such a saggar has a high reactivity with lithium-containing compounds, there arises a problem that mixing in of a reaction product lowers purity of a lithium-containing compound after subjected to heat treatment. Especially in a case of a positive-electrode active material of a lithium-ion battery, such mixed-in impurities not only cause a decrease in battery performance of a resultant lithium-ion battery but also have a risk of becoming sources of short circuiting.

Moreover, a saggar having alumina or spinel as a main component thereof has a low reactivity with lithium-containing compounds. However, such a saggar has a high thermal expansion coefficient and has a problem that a higher content ratio of these components increases occurrence of cracking caused by thermal shock. Therefore, it has been difficult to increase the content ratio of alumina or spinel.

Japanese Unexamined Patent Publication No. 2009-292704 describes a saggar comprising spinel, cordierite and mullite. These materials have the aforementioned problems.

CITATION LIST

Patent Literature

[PTL 1] Japanese Unexamined Patent Publication No. 2009-292704

SUMMARY OF INVENTION

Technical Problem

The present invention has been made in view of the aforementioned actual circumstances. It is an object of the present invention to provide a container for heat treatment of a positive-electrode active material for a lithium-ion battery capable of suppressing contamination of the positive-electrode active material for the lithium-ion battery, and a method for producing the same.

Solution to Problem

In order to solve the abovementioned problems, the present inventors have conducted further research on containers for heat treatment of positive-electrode active materials for lithium-ion batteries and methods for producing the same, and have reached the present invention.

That is to say, a container for heat treatment of a positive-electrode active material for a lithium-ion battery according to the present invention is a container for heat treatment of a positive-electrode active material for a lithium-ion battery to hold raw material powder of the positive-electrode active material for the lithium-ion battery when the raw material powder is subjected to heat treatment, wherein the container for heat treatment of the positive-electrode active material for the lithium-ion battery is characterized by having: a base portion containing 60 to 95 mass of alumina ($Al_2O_3$) when a total mass of the base portion is assumed to be 100 mass % and being free of MgO; and a surface portion containing 20 to 80 mass % of spinel when a total mass of the surface portion is assumed to be 100 mass %, formed integrally with the base portion by being compacted with the base portion by being compressed in a direction of lamination and firing an obtained compact, and constituting a surface of the container for heat treatment of the positive-electrode active material for the lithium-ion battery to be in contact with the raw material powder.

It is preferable that in the container for heat treatment of the positive-electrode active material for the lithium-ion battery according to the present invention, a remainder of the surface portion comprises a material constituting the base portion.

It is preferable that in the container for heat treatment of the positive-electrode active material for the lithium-ion battery according to the present invention, the surface portion is contained in an amount of 5 to 40 mass % when a total mass of the container for the heat treatment of the positive-electrode active material for the lithium-ion battery is assumed to be 100 mass %.

It is preferable in the container for heat treatment of the positive-electrode active material for the lithium-ion battery according to the present invention, the base portion contains 5 to 30 mass % of silica when a total mass of the base portion is assumed to be 100 mass %.

It is preferable that in the container for heat treatment of the positive-electrode active material for the lithium-ion battery according to the present invention, the base portion is formed of alumina powder and mullite powder.

It is preferable that in the container for heat treatment of the positive-electrode active material for the lithium-ion battery according to the present invention, a boundary surface of the surface portion on a base portion side thereof has concavities and convexities.

It is preferable that in the container for heat treatment of the positive-electrode active material for the lithium-ion battery according to the present invention, the base portion has a porosity of 10 to 30%.

A method for producing a container for heat treatment of a positive-electrode active material for a lithium-ion battery according to the present invention is characterized by comprising: a step of placing alumina-based powder containing 60 to 95 mass % of alumina while keeping the alumina-based powder uncompressed; a step of placing spinel-based powder containing 20 to 80 mass % of spinel above the alumina-based powder while keeping the spinel-based powder uncompressed; a step of forming a compact by compressing the alumina-based powder and the spinel-based powder in a direction of lamination of these powders; and a step of firing the compact.

It is preferable that in the method for producing a container for heat treatment of a positive-electrode active material for a lithium-ion battery compound according to the present invention, a remainder of the spinel-based powder is the alumina-based powder.

It is preferable that in the method for producing a container for heat treatment of a positive-electrode active material for a lithium-ion battery according to the present invention, the spinel-based powder contains 20 to 80 mass % of spinel when a total mass of the container for heat treatment of the lithium-containing compound is assumed to be 100 mass %.

It is preferable that in the method for producing a container for heat treatment of a positive-electrode active material for a lithium-ion battery according to the present invention, the alumina-based material contains 5 to 30 mass % of silica powder when a total mass of the alumina-based powder is assumed to be 100 mass %.

It is preferable that in the method for producing a container for heat treatment of a positive-electrode active material for a lithium-ion battery according to the present invention, the alumina-based powder is mixed powder of alumina powder and mullite powder.

Advantageous Effects of Invention

In the container for heat treatment of the positive-electrode active material for the lithium-ion battery according to the present invention, the surface portion to be in contact with the raw material powder contains a large amount of spinel, which has a low reactivity with the raw material powder.

That is to say, the container for heat treatment of the positive-electrode active material for the lithium-ion battery according to the present invention is a container capable of suppressing contamination of the raw material powder due to its suppressed reactivity with the lithium-containing compound and at the same time capable of being suppressed from being cracked (damaged) by thermal shock.

The method for producing the container for heat treatment of a positive-electrode active material for a lithium-ion battery according to the present invention exhibits an advantageous effect of being capable of producing the aforementioned container for heat treatment of a positive-electrode active material for a lithium-ion battery according to the present invention. Moreover, the method for producing a container for heat treatment of a lithium-containing compound according to the present invention can produce a container for heat treatment of a lithium-containing compound which is suppressed from peeling in a direction of lamination by forming a compact by layering and compressing alumina-based powder and spinel-based powder.

MODES FOR CARRYING OUT THE INVENTION

Figure 1:
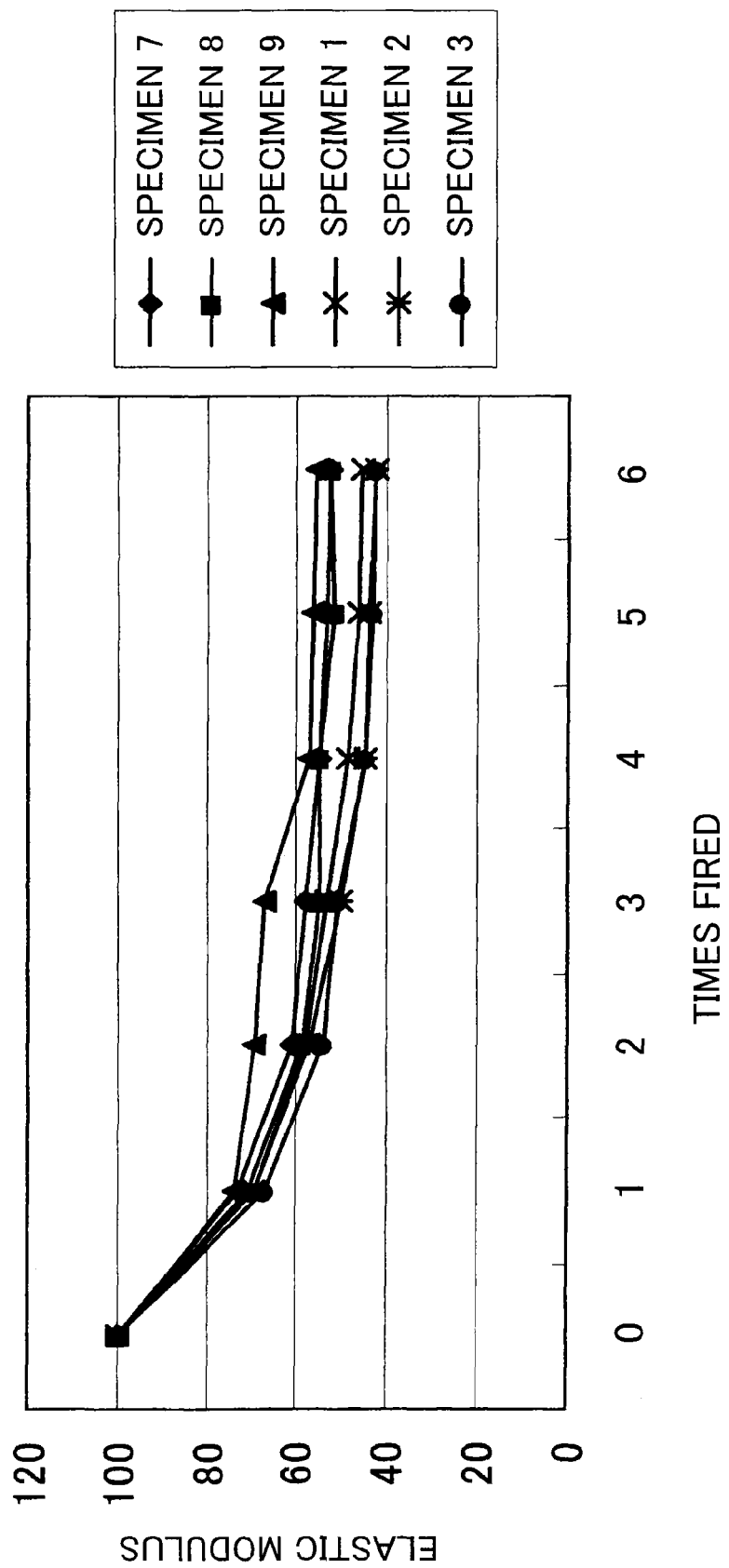
FIG. 1 is a graph showing measurement results of elastic modulus of Specimens 1 to 3.

Container for Heat Treatment of Positive-Electrode Active Material for Lithium-Ion Battery The container for heat treatment of a positive-electrode active material for a lithium-ion battery according to the present invention (hereinafter referred to as the heat treatment container of the present invention) is a container for heat treatment of a positive-electrode active material for a lithium-ion battery to hold raw material powder of the positive-electrode active material for the lithium-ion battery when the raw material powder is subjected to heat treatment. The raw material powder of the positive-electrode active material for the lithium-ion battery to be thermally treated in the heat treatment container of the present invention only has to be a compound which contains lithium (Li) in its chemical formula and, besides, can be a mixture with a lithium-containing compound.

The heat treatment container of the present invention is integrally formed of a base portion comprising a highly heat resistant material, and a surface portion containing a large amount of (having as a main component) a material having a low reactivity with the compound to be thermally treated. That is to say, the heat treatment container of the present invention has a base portion and a surface portion.

In the heat treatment container of the present invention, the base portion contains 60 to 95 mass % of alumina ($Al_2O_3$) when a total mass of the base portion is assumed to be 100 mass % and is free of MgO.

Alumina contained in the base portion of the heat treatment container of the present invention as a main component material thereof is a highly heat resistant material. Since the base portion contains a large amount of this alumina, the base portion and the heat treatment container improve in heat resistance. Moreover, since the base portion of the heat treatment container of the present invention contains 60 to 95 mass % of alumina when a total mass of the base portion is assumed to be 100 mass %, the heat treatment container improves in thermal shock resistance. Here, when the content ratio is less than 60 mass %, the base portion easily reacts with a lithium-containing compound. When the content ratio exceeds 95 mass %, the heat treatment container easily cracks. A more preferred content ratio is 70 to 90 mass %.

Furthermore, alumina is a material having a relatively low reactivity with raw material powder of a positive-electrode active material for a lithium-ion battery. That is to say, since the base portion which does not constitute the surface portion contains a large amount of alumina in the heat treatment container of the present invention, the heat treatment container is suppressed from reacting with the lithium-containing compound and yielding a reaction product when raw material powder of a positive-electrode active material for a lithium-ion battery is subjected to heat treatment. As a result, the compound to be thermally treated is suppressed from being contaminated by the reaction product.

In the heat treatment container of the present invention, the surface portion contains 20 to 80 mass % of spinel when a total mass of the surface portion is assumed to be 100 mass %, is formed integrally with the base portion by being compacted with the base portion by being compressed in a direction of lamination and firing an obtained compact, and constitutes a surface of the container for heat treatment of the positive-electrode active material for the lithium-ion battery to be in contact with the raw material powder.

The surface portion to be in contact with the raw material powder contains a large amount of spinel, which has a low reactivity with the raw material powder of the positive-electrode active material for the lithium-ion battery. This suppresses the surface portion from reacting with the raw material powder during heat treatment, and suppresses a reaction product thereof from contaminating the raw material powder. As a result, the raw material powder is suppressed from being contaminated by the reaction product.

Moreover, in the heat treatment container of the present invention, the surface portion contains 20 to 80 mass % of spinel when a total mass of the surface portion is assumed to be 100 mass %. Since the surface portion contains 20 to 80 mass % of spinel, the surface portion is suppressed from reacting with the lithium-containing compound, and at the same time improves in thermal shock resistance. Here, when the content ratio is less than 20 mass %, the surface portion easily reacts with the lithium-containing compound. When the content ratio exceeds 80 mass %, the heat treatment container easily cracks. A more preferred content ratio is 30 to 70 mass %.

Moreover, in the heat treatment container of the present invention, the surface portion and the base portion are formed integrally with each other by forming a compact by compressing the base portion and the surface portion in a direction of lamination and firing the compact. Since the surface portion and the base portion are formed integrally with each other, even if one of the portions (the surface portion) tries to change in volume during the heat treatment, the other of the integrally formed portions (the base portion) restricts the change in volume. As a result of this, the entire heat treatment container is restricted from excessively changing in volume, and the heat treatment container is suppressed from cracking.

Thus, the heat treatment container of the present invention is a container capable of suppressing contamination of the raw material of the positive-electrode active material for the lithium-ion battery due to its suppressed reactivity with the raw material of the positive-electrode active material for the lithium-ion battery and at the same time capable of being suppressed from being cracked (damaged) by thermal shock.

It is preferable that in the heat treatment container of the present invention, a remainder of the surface portion comprises a material constituting the base portion. Having the surface portion also contain a material constituting the base portion can also provide the surface portion an effect of improving heat resistance, which is obtained by the base portion.

Furthermore, when the surface portion and the base portion are formed in contact with each other and the surface portion also has a material constituting the base portion, these two portions improve in adhesion and are suppressed from peeling at their boundary.

It is preferable that in the heat treatment container of the present invention, the surface portion is contained in an amount of 5 to 40 mass % when a total mass of the heat treatment container is assumed to be 100 mass %. When the ratio of the surface portion is below this range, an effect of suppressing reaction with lithium-containing compounds cannot be sufficiently obtained. When the ratio of the surface portion is above this range, it causes cracking of the heat treatment container, and peeling or detachment of the surface portion. A more preferred ratio of the surface portion is 10 to 30 mass %.

It is preferable that in the heat treatment container of the present invention, the base portion contains 5 to 30 mass % of silica ($SiO_2$) when a total mass of the base portion is assumed to be 100 mass %. Silica is a compound which exhibits an effect of improving thermal shock resistance of the heat treatment container. However, silica has reactivity with the raw material of the positive-electrode active material for the lithium-ion battery to be thermally treated, so when the surface portion contains a material constituting the base portion as mentioned above, a smaller silica content is preferred. Therefore, with a silica content within this range, the raw material of the positive-electrode active material for the lithium-ion battery can be suppressed from being contaminated while the heat treatment container improves in thermal shock resistance. A more preferred content ratio is 10 to 20 mass %.

If the silica content ratio is below this range, the alumina content ratio relatively increases and it is difficult to obtain an effect of improving thermal shock resistance. If the silica content ratio is above this range, the container easily reacts with the raw material of the positive-electrode active material for the lithium-ion battery and in some cases, contamination of the raw material of the positive-electrode active material for the lithium-ion battery is liable to occur due to a reaction product.

It is preferable that the base portion is formed of alumina powder and mullite powder. Alumina is a chemical compound represented by a chemical formula $Al_2O_3$. Mullite is a chemical compound of alumina ($Al_2O_3$) and silica ($SiO_2$), (aluminosilicate), and has a compositional formula $Al_6O_{13}Si_2$. That is to say, upon being formed of alumina powder and mullite powder, the base portion does not contain a material (a chemical compound) which easily reacts with lithium-containing compounds, so the lithium-containing compound can be suppressed from being contaminated while the heat treatment container of the present invention improves in thermal shock resistance. In the present invention, it is preferable not to contain a material (a chemical compound) which easily reacts with lithium-containing compounds. An example of such a material is magnesia (MgO). Here, being formed of alumina powder and mullite powder means not only being formed of alumina powder and mullite powder alone but also being formed so as to have alumina powder and mullite powder as main components thereof. Furthermore, in the present invention, the base portion can contain inevitable impurities.

It is preferable that in the heat treatment container of the present invention, the base portion is formed of alumina powder and mullite powder alone. Upon being formed of alumina powder and mullite powder alone, the base portion does not contain other inorganic elements which have reactivity with the raw material powder of the positive-electrode active material for the lithium-ion battery, so the raw material powder of the positive-electrode active material for the lithium-ion battery can be suppressed from being contaminated while the heat treatment container of the present invention improves in thermal shock resistance. For example, cordierite, which is a main component material of conventional saggars, contains magnesia, and this magnesia reacts with a lithium-containing compound and yields a reaction product.

It is preferable that in the heat treatment container of the present invention, a boundary surface of the surface portion on a base portion side thereof has concavities and convexities. Upon being formed in such a shape, a boundary surface of the surface portion in contact with another portion (the base portion or an intermediate portion) forms an intricate and complex shape (concavities and convexities) and these two portions strongly adhere to each other. As a result, peeling (detachment) of the surface portion does not occur. Moreover, even if the surface portion tries to change in volume, the change in volume can be more strongly restricted.

It is preferable that in the present invention, the base portion has a porosity of 10 to 30%. When the porosity is less than this range, cracking due to heat treatment is liable to occur. When the porosity is more than this range, it causes peeling due to corrosion of lithium.

It is preferable that the heat treatment container of the present invention has one or more intermediate portions disposed between the base portion and the surface portion and having a lower content ratio of a material having a low reactivity with the compound to be thermally treated than that of the surface portion. With this construction, the content ratio of a material having a low activity with the compound to be thermally treated gradually changes in a lamination direction from the base portion to the surface portion and a sharp change in characteristics does not occur.

It is preferable that a plurality of intermediate portions, if provided, have a lower content ratio of the material having a low reactivity with the compound to be thermally treated, as it goes from a surface portion side to a base portion side.

In the heat treatment container of the present invention, heat treatment applied to the raw material powder of the positive-electrode active material for the lithium-ion battery is not limited to a treatment of heating the raw material powder of the positive-electrode active material for the lithium-ion battery with the raw material powder of the positive-electrode active material for the lithium-ion battery held by the heat treatment container of the present invention, but includes a heating (firing) treatment for generating the raw material powder of the positive-electrode active material for the lithium-ion battery. That is to say, heat treatment temperature is not limited. Additionally, an atmosphere for heat treatment is not limited, except that it is preferable that the atmosphere does not react with the heat treatment container.

Shape of the heat treatment container of the present invention is not particularly limited as long as the raw material powder of the positive-electrode active material for the lithium-ion battery can be placed in (held by) the container. Examples of the shape include a rough shape of a plate having an upper surface which the raw material powder of the positive-electrode active material for the lithium-ion battery is placed on (held by, fixed to), a shape of a tub (a tube) having an opening on a top or a side, a closed shape of a tub (a tube) which has an opening covered with a lid member (what is called a saggar). It should be noted that in the heat treatment container of the present invention, a portion not to be in contact the raw material powder of the positive-electrode active material for the lithium-ion battery compound can be formed of a different material.

In this case, the lithium-containing compound to be thermally treated in the heat treatment container of the present invention can be held by the heat treatment container in either a powder form or a compact form.

Container for Heat Treatment of Positive-Electrode Active Material for Lithium-Ion Battery A method for producing a container for heat treatment of a positive-electrode active material for a lithium-ion battery according to the present invention comprises: a step of placing alumina-based powder containing 60 to 95 mass % of alumina while keeping the alumina-based powder uncompressed; a step of placing spinel-based powder containing 20 to 80 mass % of spinel above the alumina-based powder while keeping the spinel-based powder uncompressed; a step of forming a compact by compressing the alumina-based powder and the spinel-based powder in a direction of lamination of these powders; and a step of firing the compact.

In the method for producing the container for heat treatment of the positive-electrode active material for the lithium-ion battery according to the present invention, first performed is a step of placing alumina-based powder containing 60 to 95 mass % of alumina ($Al_2O_3$) while keeping the alumina-based powder uncompressed. Since the alumina-based powder is placed while kept uncompressed, when the powder is compacted in a subsequent step, a boundary surface of a base portion attains an intricate boundary surface, so the base portion does not peel off at the boundary surface in the heat treatment container. Moreover, a change in volume of the heat treatment container can be restricted more effectively.

Since the alumina-based powder comprises powder (mixed powder) containing 60 to 95 mass % of alumina ($Al_2O_3$), a heat treatment container to be produced and a base portion thereof improve in thermal shock resistance.

Second performed is a step of placing spinel-based powder containing 20 to 80 mass % of spinel above the alumina-based powder while keeping the spinel-based powder uncompressed. This step is a step of placing spinel-based powder to constitute a surface portion. With this step, the production method can produce a heat treatment container having a surface portion.

Since the spinel-based powder comprises power (mixed powder) containing 20 to 80 mass % of spinel, a resultant heat treatment container improves in thermal shock resistance while the surface portion is suppressed from reacting the raw material powder of the positive-electrode active material for the lithium-ion battery.

The spinel-based powder only has to be placed above the alumina-based powder. It is possible to place the spinel-based powder directly on the alumina-based powder. It is also possible to place another powder (powder for forming an intermediate layer) on the alumina-based powder first and then place the spinel-based powder thereon.

Then in a step of forming a compact by compressing the alumina-based powder and the spinel-based powder in a direction of lamination of these powders, a compact is formed in a shape of a heat treatment container by compressing the alumina-based powder and the spinel-based powder placed in the foregoing steps.

It is preferable to comprise a step of drying the compact at room temperature. Drying the compact can suppress the compact (the heat treatment container) from being cracked or deformed (decreasing in dimensional accuracy) in a subsequent firing step.

The step of firing the compact is to fire the compact. A heat treatment container is produced by firing the compact in which the powders are compressed.

It is preferable that in the production method of the present invention, a remainder of the spinel-based powder is the alumina-based powder. Having the spinel-based powder also contain the alumina-based powder means having the surface portion contain a material constituting the base portion, so it can also provide the surface portion an effect of improving thermal shock resistance, which is obtained by the base portion.

Moreover, when the surface portion and the base portion are formed in contact with each other, having a material constituting the base portion also contained by the surface portion improves adhesion between these two portions and suppresses peeling at their boundary.

It is preferable that in the production method of the present invention, the spinel-based powder contains 20 to 80% of spinel when a total mass of the container for heat treatment of the lithium-containing compound is assumed to be 100 mass %. That is to say, it is preferable that the surface portion constituted by the spinel-based powder contains 20 to 80 mass % of the container. When the content of the spinel-based powder is below this range, an effect of suppressing a reaction with the lithium-containing compound cannot be sufficiently obtained. When that content ratio is above 80 mass %, it causes cracking and peeling due to a difference in thermal expansion coefficient. A more preferred content ratio is 30 to 70 mass %.

It is preferable that in the production method of the present invention, the alumina-based material contains 5 to 30 mass % of silica powder ($SiO_2$) when a total mass of the alumina-based powder is assumed to be 100 mass %. Silica is a chemical compound which exhibits an effect of improving thermal shock resistance of the heat treatment container. Moreover, silica has reactivity with the lithium in the lithium-containing compound to be thermally treated, so when the surface portion contains a material constituting the base portion as mentioned above, a smaller silica content is preferred. Therefore, with the silica content within this range, the lithium-containing compound can be suppressed from being contaminated while the heat treatment container improves in thermal shock resistance. A more preferred content is 10 to 20 mass %.

If the silica content ratio is below this range, the alumina content relatively increases and it is difficult to obtain an effect of improving thermal shock resistance. If the silica content ratio is above this range, the heat treatment container easily reacts with the lithium-containing compound, and in some cases, contamination of the raw material powder of the positive-electrode active material for the lithium-ion battery is liable to occur due to a reaction product.

It is preferable that the alumina-based powder is mixed powder of alumina powder and mullite powder. Alumina is a chemical compound represented by a chemical formula $Al_2O_3$. Mullite is a chemical compound of alumina ($Al_2O_3$) and silica ($SiO_2$), (aluminosilicate), and has a compositional formula $Al_6O_{13}Si_2$. That is to say, upon being formed of alumina and mullite, the base portion does not contain a material (a chemical compound) which easily reacts with the raw material powder of the positive-electrode active material for the lithium-ion battery, so the raw material powder of the positive-electrode active material for the lithium-ion battery can be suppressed from being contaminated while the heat treatment container of the present invention improves in thermal shock resistance. In the present invention, it is preferable not to contain a material (a chemical compound) which easily reacts with the raw material powder of the positive-electrode active material for the lithium-ion battery. An example of such a material is magnesia (MgO). Here, being formed of alumina and mullite means not only being formed of alumina and mullite alone but also being formed so as to have alumina and mullite as main components thereof. Furthermore, in the present invention, the alumina-based powder can contain inevitable impurities.

It is preferable that in the production method of the present invention, the alumina-based power is formed of alumina powder and mullite powder alone. Upon being formed of alumina powder and mullite powder alone, the alumina-based powder does not contain other inorganic elements which have reactivity with the lithium-containing compound, so the raw material powder of the positive-electrode active material for the lithium-ion battery can be suppressed from being contaminated while the heat treatment container of the present invention improves in thermal shock resistance. For example, cordierite, which is a main component material of conventional saggars, contains magnesia (MgO), and this magnesia reacts with the raw material powder of the positive-electrode active material for the lithium-ion battery and yields a reaction product.

It is preferable that the production method of the present invention comprises a step of placing one or more intermediate powders having a lower spinel content than the spinel-based powder, between the alumina-based powder and the spinel-based powder. With this construction, the heat treatment container has an intermediate portion in which the content ratio of a material having a low reactivity with the compound to be thermally treated gradually changes in a lamination direction from the base portion to the surface portion and a sharp change in characteristics does not occur.

It is preferable that a plurality of intermediate powders, if provided, have a lower spinel content as it goes from a spinel-based powder side toward an alumina-based powder side.

It is preferable that in the production method of the present invention, steps of placing materials in a layered structure, such as the step of placing the alumina-based powder, which is a highly heat resistant material, the step of placing the spinel-based powder, which is a material having a low reactivity with the compound to be thermally treated, and the step of placing one or more intermediate powders, include a step of forming concavities and convexities on boundary surfaces. Upon including this step, the heat treatment container produced by the production method of the present invention is suppressed from peeling at boundary surfaces of the base portion, the surface portion, the one or more intermediate portions and so on.

In the production method of the present invention, compacting conditions of the compacting step and firing conditions of the firing step can be appropriately determined. However, it is preferable that the treatment container to be produced, its base portion, its surface portion, and its intermediate portion have a porosity of 10 to 30%. A more preferred porosity is 15 to 25%. When the porosity is below this range, the heat treatment container easily cracks. When the porosity is above this range, it becomes a cause of peeling due to lithium corrosion, and at the same time the heat treatment container deteriorates in thermal shock resistance and is liable to crack (be damaged).

EXAMPLES

Hereinafter, the present invention will be specifically described by way of examples.

Plate-shaped containers for heat treatment of a positive-electrode active material for a lithium-ion battery were produced as examples of the present invention.

Example 1

Alumina powder, mullite powder, cordierite powder and other additives were weighed in the mass parts shown in Table 1, and mixed well. Thus alumina-based powders of Specimens A to C were prepared.

TABLE 1

| RAW MATERIAL | SPECIMEN A | SPECIMEN B | SPECIMEN C |
|---|---|---|---|
| Alumina | 85.0 | 85.0 | 40.0 |
| Mullite | 5.0 | 3.0 | 25.0 |
| Cordierite | — | — | 25.0 |
| Clay | 10.7 | 12.7 | 10.7 |
| Sillimanite | — | 5.0 | — |
| Binder | 1.0 | — | 1.0 |
| Total | 101.7 | 105.7 | 101.7 |
| $Al_2O_3$ | 86.9 | 77.9 | 63.5 |
| $SiO_2$ | 10.6 | 13.2 | 29.5 |
| MgO | — | — | 3.2 |

Used as spinel-based powders were mixed powders prepared by mixing spinel powder having a grain size of 200 (mesh) and one of Specimens A to C in equal parts by weight (in equal mass parts), respectively.

First, the well-mixed alumina-based powders of Specimens A to C were respectively introduced into cavities of molding dies and placed on bottom surfaces while keeping the alumina-based powders uncompressed.

Subsequently, the spinel-based powders were respectively introduced and placed on the placed alumina-based powders while keeping the spinel-based powders uncompressed. Here, mixing ratio (ratio by mass) of the alumina-based powders and the spinel-based powders is shown in Table 2.

Next, the molding dies in which the respective powders were placed were pressed to form compacts having a square plate shape. This compaction was carried by applying a pressure of 6 kN/cm².

Then, the compacts were dried by being held at room temperature for 24 hours.

Then, the dried compacts were sintered (fired) by being held at 1,350 deg. C. for 5 hours in an air atmosphere.

The compacts after fired were cooled, thereby producing plate-shaped containers for heat treatment of a positive-electrode active material for a lithium-ion battery (Specimens 1 to 6).

The containers for heat treatment of the positive-electrode active material for the lithium-ion battery of Specimens 1 to 3 were heat treatment containers integrally formed of a base portion which contained 87.2 mass % of alumina, which has good heat resistance, and a surface portion which contained 60 to 95 mass % of Specimen A constituting the base portion and 5 to 40 mass % of spinel, which has a low reactivity with lithium.

The containers for heat treatment of the positive-electrode active material for the lithium-ion battery of Specimens 4 to 6 were heat treatment containers integrally formed of a base portion which had alumina, mullite and cordierite as main components thereof, and a surface portion which contained 60 to 95 mass % of Specimen C constituting the base portion and 5 to 40 mass % of spinel, which has a low reactivity with lithium.

Porosity, bulk specific gravity, and apparent specific gravity of the produced containers for heat treatment of the positive-electrode active material for the lithium-ion battery of Specimens 1 to 6 were respectively examined, and measurement results are shown together in Table 2.

The measurement of porosity and bulk specific gravity were carried out by the method defined in the Japanese Industries Standards JIS R 1634 (the vacuum method)].

The apparent specific gravity was obtained by measuring weight (mass) and volume and dividing the weight by the volume.

It can be confirmed from Table 2 that the heat treatment containers of Specimens 1 to 3 had much smaller porosities than the heat treatment containers of Specimens 4 to 6.

Evaluation

A lithium-containing compound ($LiNi_{1/3}Co_{1/3}Mn_{1/3}O_2$) was fired by using the heat treatment containers of Speci-

TABLE 2

| | MIXING RATIO (RATIO BY MASS) | | | | | | | | | |
|---|---|---|---|---|---|---|---|---|---|---|
| | BASE PORTION (ALUMINA-BASED POWDER) | | | | SURFACE PORTION (SPINEL-BASED POWDER) | | | | | |
| | SPEC-IMEN A | SPEC-IMEN B | SPEC-IMEN C | SPEC-IMEN D | TOTAL | SPINEL | BASE PORTION MATERIAL | TOTAL | POROSITY (%) | BULK SPECIFIC GRAVITY | APPARENT SPECIFIC GRAVITY |
| SPECIMEN 1 | 90 | — | — | — | 90 | 5 | 5 | 10 | 21.0 | 2.73 | 3.46 |
| SPECIMEN 2 | 80 | — | — | — | 80 | 10 | 10 | 20 | 21.7 | 2.73 | 3.49 |
| SPECIMEN 3 | 70 | — | — | — | 70 | 15 | 15 | 30 | 21.0 | 2.72 | 3.11 |
| SPECIMEN 4 | — | — | 90 | — | 90 | 5 | 5 | 10 | 31.5 | 2.06 | 3.01 |
| SPECIMEN 5 | — | — | 80 | — | 80 | 10 | 10 | 20 | 30.6 | 2.11 | 3.04 |
| SPECIMEN 6 | — | — | 70 | — | 70 | 15 | 15 | 30 | 27.6 | 2.17 | 2.99 |
| SPECIMEN 7 | 100 | — | — | — | — | — | — | — | — | — | — |
| SPECIMEN 8 | — | 100 | — | — | — | — | — | — | — | — | — |
| SPECIMEN 9 | — | — | — | 100 | — | — | — | — | — | — | — | mens 1 to 6, and a variation in elastic modulus during the test and states after firing the compound were observed.

Specifically speaking, the firing and observation were carried out as follows.

First, 3/2 mol % of lithium carbonate ($Li_2CO_3$) powder, ⅓ mol % of cobalt oxide ($Co_3O_4$) powder, 1 mol % of manganese dioxide ($MnO_2$) powder, and 1 mol % of nickel hydroxide ($Ni(OH)_2$) powder were weighed and well mixed, and then the mixture was compacted in disk-shaped pellets. These pellets had a diameter of 18 mm and a thickness of 5 mm and weighed 4 g each.

The produced pellets were placed on surfaces of the containers for heat treatment of the positive-electrode active material for the lithium-ion battery of the respective specimens, and then placed in a firing furnace and fired by heating.

The firing of the pellets was carried out by increasing temperature up to 1,100 deg. C. in 4 hours and, after the rise in temperature, keeping the temperature at 1,100 deg. C. for 4 hours in an air atmosphere, and then standing to cool in the air.

After cooled, the pellets were removed from the surfaces of the heat treatment containers of the respective specimens, and other new pellets (unfired ones) were placed on the surfaces and fired. Heating was performed under similar treatment conditions.

This operation of firing pellets was repeated twenty times.

A cross sectional surface of each of the specimens after firing pellets twenty times was observed.

A similar evaluation test was also performed on the heat treatment containers of Specimens 7 to 9. It should be noted that Specimens 7 to 9 were heat treatment containers which had composition shown together in Table 2 and were formed so as to have no surface portion. Specifically, Specimen 7 was a heat treatment container only comprising the base portion of Specimens 1 to 3. Specimen 8 was a heat treatment container only comprising Specimen B, which contained a large amount of alumina like Specimen 7. Specimen 9 was a conventional mullite-cordierite-based heat treatment container.

Cross-Section Observation

A cross section of each of the heat treatment containers of Specimens 1 to 9 after the test of firing pellets twenty times were observed.

First, in each of Specimens 7 to 8, corrosion (infiltration or diffusion) of the lithium-containing compound was observed in a neighborhood of a portion which had been in contact with the pellets. In addition, a slight swell (a variation in volume) was confirmed in the neighborhood of the contact portion. The corrosion of the lithium-containing compound and the variation in volume were greater in Specimen 8 than in Specimen 7. Note that it was confirmed that surfaces of Specimens 7 to 8 in the neighborhood of the portion which had been in contact with the pellets were maintained almost smooth.

In Specimen 9, corrosion (infiltration or diffusion) of the lithium-containing compound was observed in a neighborhood of a portion which had been in contact with the pellets. In addition, surface roughening and a swell (a variation in volume) were confirmed in the portion which had been in contact with the pellets. This rough surface had a different color from those of the container and the portion penetrated by the lithium-containing compound, and it is apparent from this that the rough surface is a product of reaction with lithium. Moreover, this rough surface was brittle and easily peeled off. This rough surface was formed by a reaction between the portion in contact with the pellets and the lithium-containing compound of the pellets.

In Specimens 1 to 3, corrosion (infiltration or diffusion) of the lithium-containing compound or surface roughening (a swell near the surface) could not be confirmed, though these were confirmed in Specimens 7 to 9.

In each of Specimens 4 to 6, surface roughening was confirmed in a portion which had been in contact with the pellets. This rough surface was brittle and easily peeled off. This surface roughening was formed by a reaction between the portion in contact with the pellets and the lithium-containing compound of the pellets. Moreover, it was confirmed that a reaction product generated in a neighborhood of the portion in contact with the pellets developed cracks which were to serve as starting points of peeling off, at a boundary with the surface portion. That is to say, in Specimens 4 to 6, not only the surface of the portion which had been in contact with the pellets (the reaction product) was roughened but also the reaction product itself was liable to peel off.

As mentioned above, it was confirmed that the heat treatment containers of Specimens 1 to 3 were containers capable of suppressing contamination of the lithium-containing compound due to their suppressed reactivity with the lithium-containing compound and at the same time capable of being suppressed from being cracked (damaged) by thermal shock.

Elastic Modulus

Elastic modulus of the heat treatment containers of Specimens 1 to 6 was measured during the aforementioned test of repeated firing.

It should be noted that the elastic modulus of the containers during the test was measured with the pellets removed after firing the pellets first to sixth times. Measurement results are shown in FIGS. 1 to 2.

The measurement of elastic modulus was performed by the method defined in the Japanese Industrial Standards [JIS R 1602 (the flexural resonance method)].

Figure 2:
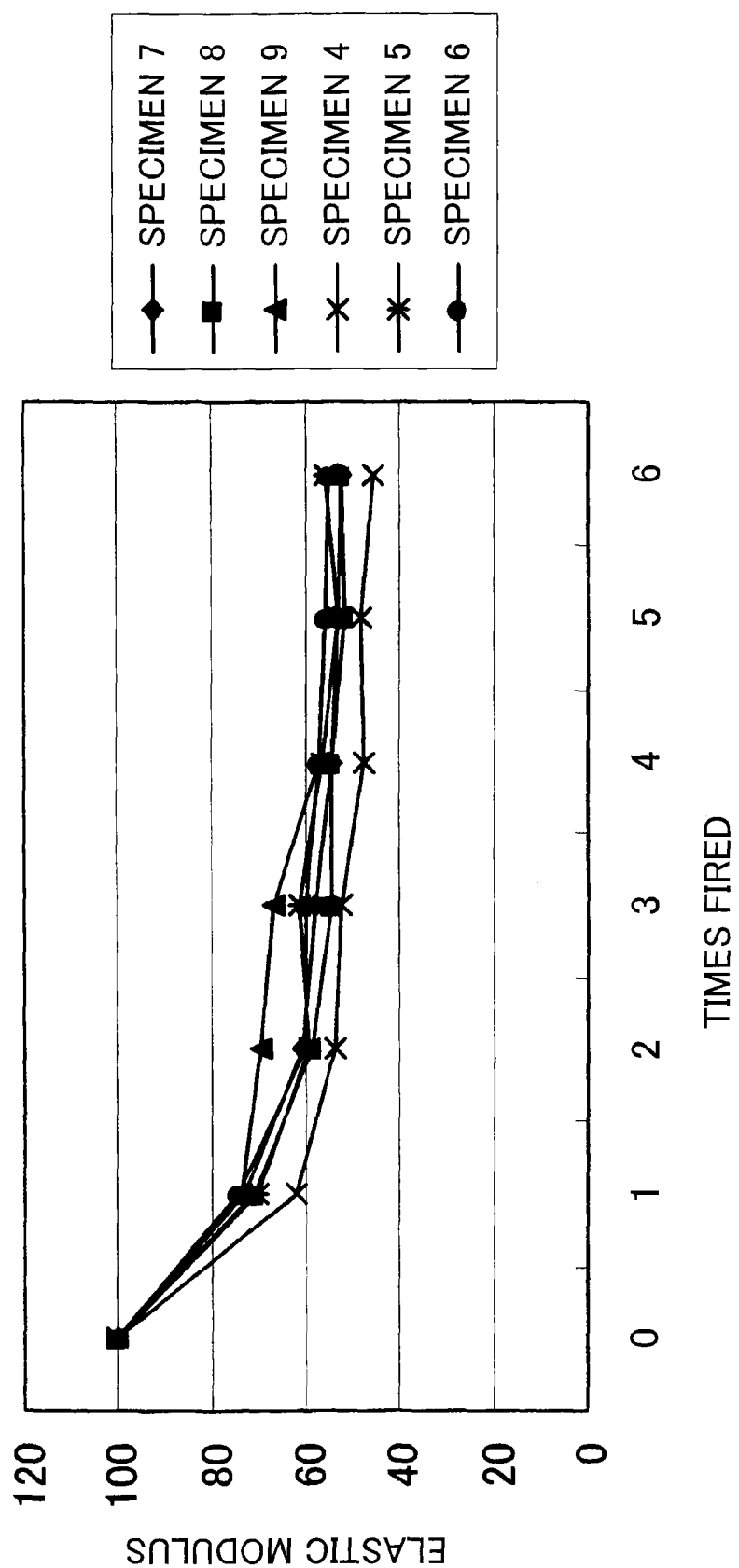
FIG. 2 is a graph showing measurement results of elastic modulus of Specimens 4 to 6.

FIG. 1 shows the measurement results of elastic modulus of Specimens 1 to 3 and 7 to 9, and FIG. 2 shows the measurement results of elastic modulus of Specimens 4 to 6, 7 to 9. In FIGS. 1 and 2, elastic modulus is indicated by a ratio when elastic modulus of each of the containers before firing pellets is assumed to be 100%. As shown in FIGS. 1 and 2, Specimen 1 to 9 exhibited the same level of elastic modulus. That is to say, it was confirmed that although having a spinel-containing surface portion, each of the heat treatment containers of Specimens 1 to 3 had the same level of elastic modulus (characteristics) as those of conventional ones. It should be noted that the heat treatment containers of Specimens 7 to 9 (the heat treatment container of Specimen 9 in particular) correspond to conventional products.

Example 2

Heat treatment containers of Specimens 10 to 19 were produced in the same way as in Example 1, except that used as spinel-based powders for forming surface portions were mixed powders prepared by changing the mixing ratio of Specimen A or Specimen C and spinel in Specimens 2 and 5. Ratio of the raw materials for forming a surface portion of each of the heat treatment containers of Specimens 10 to 19 is shown in Table 3. In Example 2, Specimen 12 and Specimen 17 are the same as Specimen 2 and Specimen 5, respectively.

TABLE 3

| | RATIO IN SURFACE PORTION (mass ratio) | | |
|---|---|---|---|
| | SPECIMEN A | SPECIMEN C | SPINEL |
| SPECIMEN 10 | 70 | — | 30 |
| SPECIMEN 11 | 60 | — | 40 |
| SPECIMEN 12 | 50 | — | 50 |
| SPECIMEN 13 | 40 | — | 60 |
| SPECIMEN 14 | 30 | — | 70 |
| SPECIMEN 15 | — | 70 | 30 |
| SPECIMEN 16 | — | 60 | 40 |
| SPECIMEN 17 | — | 50 | 50 |
| SPECIMEN 18 | — | 40 | 60 |
| SPECIMEN 19 | — | 30 | 70 |
| SPECIMEN 20 | 20 | — | 80 |
| SPECIMEN 21 | 10 | — | 90 |
| SPECIMEN 22 | — | — | 100 |
| SPECIMEN 13 | — | 20 | 80 |
| SPECIMEN 14 | — | 10 | 90 |
| SPECIMEN 15 | — | — | 100 |

In the produced heat treatment containers of Specimens 10 to 19, a variation in elastic modulus was measured in the same way as in Example 1. Measurement results are shown in FIGS. 3 to 4.

Figure 3:
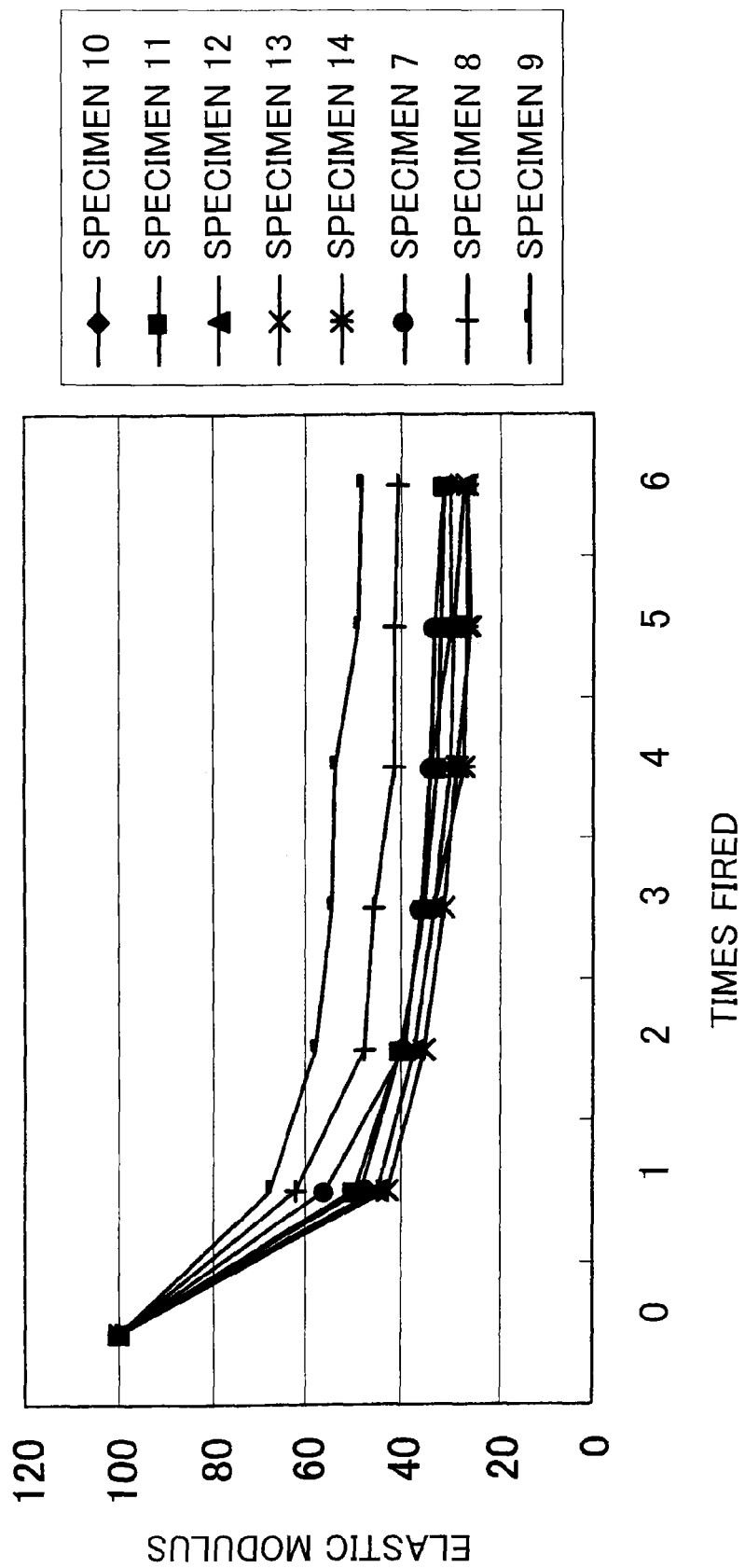
FIG. 3 is a graph showing measurement results of elastic modulus of Specimens 10 to 14.
Figure 4:
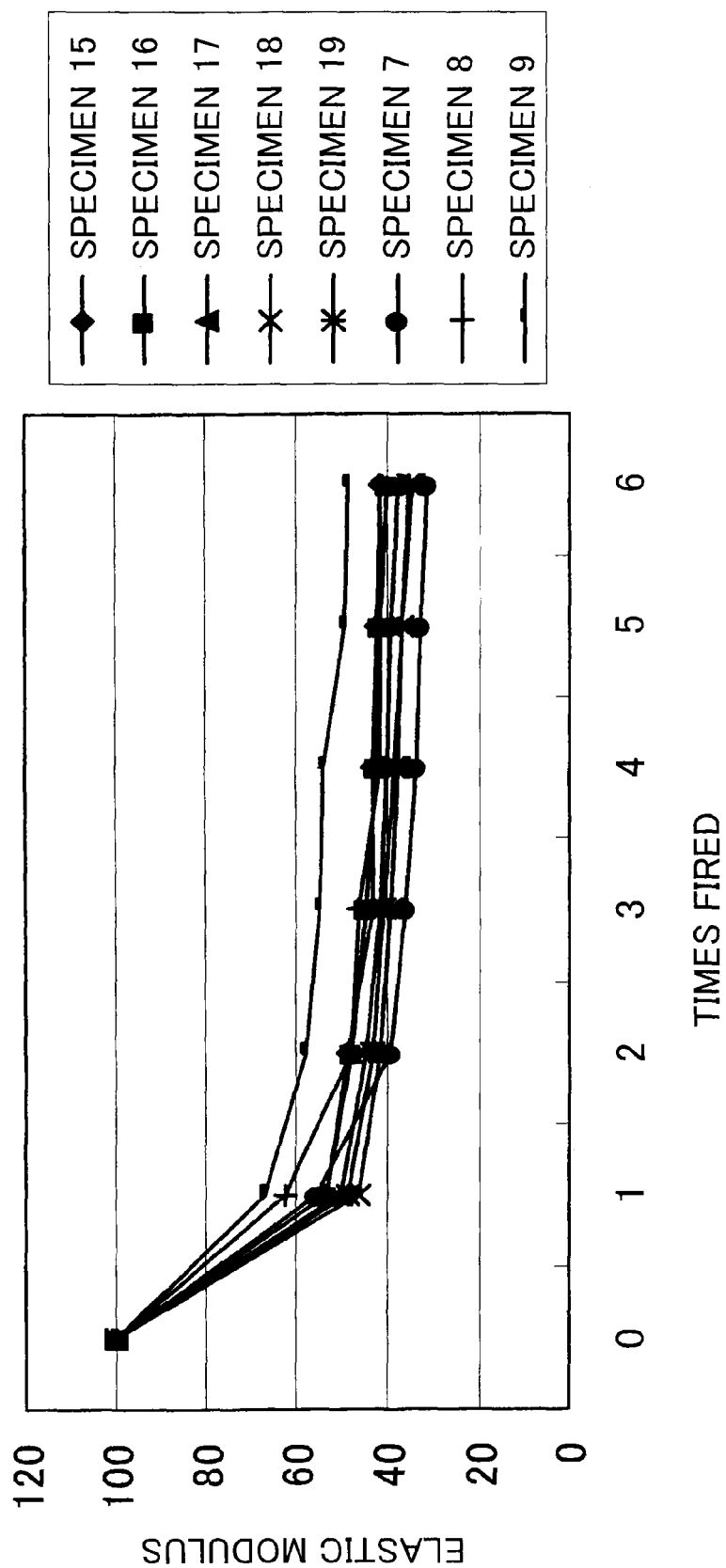
FIG. 4 is a graph showing measurement results of elastic modulus of Specimens 15 to 19.

As shown in FIGS. 3 to 4, all of Specimens 10 to 19 exhibited the same level of elastic modulus, just like the specimens shown in FIGS. 1 and 2. That is to say, it can be confirmed that even if the content ratio of spinel in the surface portion varies from 30 to 70 mass % just like in the heat treatment containers of Specimens 10 to 14, the heat treatment containers have the same level of elastic modulus (characteristics) as conventional ones.

Comparative Examples

Heat treatment containers of Specimens 20 to 25 were produced in the same way as in Example 1, except that used as spinel-based powders for forming surface portions were mixed powders prepared by changing the mixing ratio of Specimen A or Specimen C and spinel in Specimens 2 and 5.

These heat treatment containers of Specimens 20 to 25 cracked in the firing step. That is to say, the heat treatment containers could not be produced.

As mentioned above, the heat treatment containers of Specimens 1 to 3, and 10 to 14 were containers capable of suppressing contamination of the lithium-containing compound due to their suppressed reactivity with the lithium-containing compound and at the same time capable of being suppressed from being cracked (damaged) by thermal shock.

Moreover, in each of the heat treatment containers of the examples, a compact was formed by compressing (pressing), in one operation, a layered body of the alumina-based powder for forming the base portion and the spinel-based powder for forming the surface portion. That is to say, compacting costs could be reduced in the production of the heat treatment containers.

Modifications of Examples

Although the lithium-containing compound in the shape of pellets was fired by using the plate-shaped heat treatment containers in the above examples, the shape of a heat treatment container and arrangement of a lithium-containing compound are not limited to these.

The heat treatment container can have a shape such as a shape of a tub (a tube) having an opening on a top or a side, a closed shape of a tub (a tube) with its opening covered with a lid member (what is called a saggar). On the other hand, the lithium-containing compound can have a powdery shape.

Particularly when the heat treatment containers have a tub shape and the lithium-containing compound has a powdery shape, the abovementioned effects of the heat treatment containers of the examples can be exhibited more effectively.

Specifically speaking, when a powdery lithium-containing compound is put inside of a tub-shaped container and fired (subjected to heat treatment), the lithium-containing compound after fired is taken out by directing an opening of the tub-shaped container downward. At this time, contamination of the lithium-containing compound after fired does not occur because peeling attributable to a reaction product has not occurred on an inner surface (a surface which was in contact with the lithium-containing compound) of the heat treatment container.

In contrast, for example, in similarly-shaped containers to those of Specimen 7 to 9 as comparative examples, peeling attributable to a reaction product occurs on surfaces which have been in contact with the lithium-containing compound. Then, when the lithium-containing compound is taken out, the reaction product is taken out simultaneously with the lithium-containing compound. That is to say, the reaction product contaminates the lithium-containing compound.

The invention claimed is:

1. A container for heat treatment of a positive-electrode active material for a lithium-ion battery to hold raw material powder of the positive-electrode active material for the lithium-ion battery when the raw material powder is subjected to heat treatment, wherein the container comprising:
a base portion comprising 60 to 95 mass % of alumina based on a total mass of the base portion and being free of MgO; and
a surface portion comprising 20 to 80 mass % of spinel based on a total mass of the surface portion, formed integrally with the base portion by being compacted with the base portion via compression in a direction of lamination and firing an obtained compact, and constituting a surface of the container for contact with the raw material powder,
wherein the surface portion is contained in an amount of 5 to 40 mass % based on a total mass of the container.

2. The container recited in claim 1, wherein a remainder of the surface portion comprises a material constituting the base portion.

3. The container recited in claim 1, wherein the base portion contains 5 to 30 mass % of silica based on a total mass of the base portion.

4. The container recited in claim 1, wherein the base portion is formed of alumina and mullite.

5. The container recited in claim 1, wherein a boundary surface of the surface portion on a base portion side thereof has concavities and convexities.

6. The container recited in claim 1, wherein the base portion has a porosity of 10 to 30%.

7. The container recited in claim 1, wherein the base portion comprises 70 to 90 mass of alumina based on a total mass of the base portion.

8. The container recited in claim 1, wherein the surface portion comprises 30 to 70 mass % of spinel based on a total mass of the surface portion.

9. The container recited in claim 1, wherein the surface portion is contained in an amount of 10 to 30 mass % based on a total mass of the container.

10. A method for producing a container according to claim 1, the method comprising:
- placing alumina-based powder comprising 60 to 95 mass % of alumina while keeping the alumina-based powder uncompressed;
- placing spinel-based powder comprising 20 to 80 mass % of spinel above the alumina-based powder while keeping the spinel-based powder uncompressed;
- forming a compact by compressing the alumina-based powder and the spinel-based powder in a direction of lamination of these powders; and
- firing the compact.

11. The method recited in claim 10, wherein a remainder of the spinel-based powder is the alumina-based powder.

12. The method recited in claim 10, wherein the spinel-based powder comprises 20 to 80 mass % of spinel based on a total mass of the container.

13. The method recited in claim 10, wherein the alumina-based material comprises 5 to 30 mass % of silica powder based on a total mass of the alumina-based powder.

14. The method recited in claim 10, wherein the alumina-based powder is a mixed powder of alumina powder and mullite powder.

* * * * *